(12) United States Patent
Tucci

(10) Patent No.: US 9,688,553 B1
(45) Date of Patent: Jun. 27, 2017

(54) CERAMIC MICRO-POROUS WATER AERATION DIFFUSER

(71) Applicant: John J. Tucci, Richland, MI (US)

(72) Inventor: John J. Tucci, Richland, MI (US)

(73) Assignee: Lake Savers, LLC, Richland, MI (US)

( * ) Notice: Subject to any disclaimer, the term of this patent is extended or adjusted under 35 U.S.C. 154(b) by 82 days.

(21) Appl. No.: 14/837,859

(22) Filed: Aug. 27, 2015

(51) Int. Cl.
| | | |
|---|---|---|
| *B01F 3/04* | (2006.01) | |
| *C02F 1/72* | (2006.01) | |
| *B01F 15/02* | (2006.01) | |

(52) U.S. Cl.
CPC .............. *C02F 1/72* (2013.01); *B01F 3/0412* (2013.01); *B01F 3/04262* (2013.01); *B01F 3/04496* (2013.01); *B01F 15/026* (2013.01); *B01F 2003/04276* (2013.01); *B01F 2003/04312* (2013.01); *C02F 2201/002* (2013.01)

(58) Field of Classification Search
CPC ........ B01F 3/04262; B01F 2003/04276; B01F 2003/04312; B01F 3/0412; B01F 3/04496; B01F 15/026; C02F 1/72; C02F 2201/002
USPC ...................................... 261/122.1
See application file for complete search history.

(56) References Cited

U.S. PATENT DOCUMENTS

| | | | | |
|---|---|---|---|---|
| 2,023,924 A | * | 12/1935 | Hautz ................ | B01F 3/04262 261/121.1 |
| 2,294,973 A | * | 9/1942 | Ford .................. | B01F 3/04262 210/496 |
| 3,396,950 A | | 1/1967 | Wood | |
| 4,046,845 A | * | 9/1977 | Veeder ................ | B01F 3/04262 239/145 |
| 4,288,394 A | * | 9/1981 | Ewing ................ | B01F 3/04262 137/852 |
| 4,557,879 A | * | 12/1985 | Weber ................ | B01F 3/04248 261/122.1 |
| 4,563,277 A | * | 1/1986 | Tharp .................. | B01F 3/0412 210/220 |
| 4,764,314 A | | 8/1988 | Schneider | |
| 4,842,732 A | | 6/1989 | Tharp | |
| 5,075,048 A | * | 12/1991 | Veeder ................ | B01F 3/0412 261/122.1 |
| RE33,899 E | * | 4/1992 | Tyer .................... | B01F 3/04262 210/220 |

(Continued)

FOREIGN PATENT DOCUMENTS

| | | | |
|---|---|---|---|
| CN | 203715385 | | 7/2014 |
| GB | 396732 | * | 8/1933 |

*Primary Examiner* — Charles Bushey
(74) *Attorney, Agent, or Firm* — Malin Haley DiMaggio & Bowen, P.A.

(57) ABSTRACT

A water aeration diffuser has a base with an internal cavity defining an air pocket, and a ceramic plate removably attached to the base. The base is in flow communication with air supply such that air is received in the cavity and then diffused by the ceramic plate to create an aeration column in a body of water. To allow for repair and servicing, the ceramic plate is removably attached to the base by one or more fasteners. The base includes a perimeter lip around its top portion that supports the ceramic plate and maximizes the exposed surface area of the plate. A water and air-tight gasket is provided between the lip and the ceramic plate. An eye-bolt may be provided through the ceramic plate and attached to the base to provide an attachment point for a ballast or other means used to position the diffuser.

12 Claims, 4 Drawing Sheets

(56) References Cited

U.S. PATENT DOCUMENTS

| | | | | |
|---|---|---|---|---|
| 5,204,028 A * | 4/1993 | Ruston | ............... | B01F 3/04262 |
| | | | | 261/122.1 |
| 5,858,283 A | 1/1999 | Burris | | |
| 5,863,031 A | 1/1999 | Veeder et al. | | |
| 6,475,395 B1 * | 11/2002 | Schmit | ................. | B01F 3/0412 |
| | | | | 134/22.12 |
| 7,311,299 B2 | 12/2007 | Sasajima | | |
| 8,061,689 B2 | 11/2011 | Tharp | | |
| 8,794,604 B2 * | 8/2014 | Ryu | ................... | B01F 3/04262 |
| | | | | 261/122.1 |
| 2002/0041041 A1 | 4/2002 | Johnson | | |
| 2011/0169176 A1 | 7/2011 | Lux et al. | | |
| 2013/0056076 A1 * | 3/2013 | Longman | ............ | B01F 3/04262 |
| | | | | 137/1 |

* cited by examiner

CERAMIC MICRO-POROUS WATER AERATION DIFFUSER

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Ceramic fine bubble diffusers have been used in waste water treatment for decades. The principle involves delivering compressed air to a micro-porous ceramic plate, whereby the plate diffuses the compressed air into a tight column of fine bubbles which enters the surrounding water or waste water. The bubble column lifts water from the bottom of the water body to the surface where it gets oxygenated by the atmosphere. Additionally the surrounding water is aerated directly by gas diffusion between the bubbles and the water.

In addition to ceramic, other materials such as EPDM Rubber, Teflon and the like can be used to construct fine bubble diffusers. However, ceramic is advantageous due to its durability and enhanced overall performance. Diffuser technology has been adapted for use in lakes, ponds and other natural water bodies to provide aeration. One prior art example is a ceramic diffuser sold by Clean-Flo International, LLC. This diffuser comprises a ceramic plate epoxied, i.e. glued, to a base material, wherein a compressed air fitting is glued into the base material. In this example, the ceramic plate requires a channel to be cut into the underside of the ceramic plate to take the air from the air supply and distribute it through the ceramic plate. The channel covers less than 10% of the surface area of the underside of the plate, which results in poor overall performance and efficiency. Because the plate is epoxied to the base, only the top surface of the ceramic plate can be cleaned. Additionally, the glued-in compressed air fitting is prone to failure and breakage and cannot be replaced. Thus, because the underside of the ceramic plate cannot be cleaned or serviced effectively, the prior art diffuser will degrade over time and must eventually be discarded.

Other attempts have been made to provide improved aeration diffusers. For example, U.S. Pat. No. 7,311,299 to Sasajima discloses describes an aeration device having a rectangular elastic porous body, a support base made of an ABS resin supporting the body from below, and having an orifice for pressurized air, and a securing component which integrally secures the elastic porous body to the support base. The support base contains a portion supporting the elastic porous body from below and an attaching portion connected to the supporting portion and attaching the supporting portion to a pressurized air distribution pipe. The rectangular elastic porous body has a box shape having an opening portion, and the supporting portion being disposed in an elastic porous body.

U.S. Pat. No. 8,061,689 to Tharp relates to a flexible membrane disk diffuser having an enlarged sealing bead about the circumference of the membrane which is positioned within an annular channel on the diffuser body. A retainer ring threads onto the diffuser body to compress the sealing bead against a base surface of the channel. A discontinuity on the base surface provides a seal with the bead for the purpose of avoiding an undue tightening force of the retainer ring. The discontinuity may take the form of a ridge or a rut on the base surface of the channel.

U.S. Patent Publication No. 2002/0041041 to Johnson illustrates a ceramic diffuser assembly containing a diffuser fitting integrally connected to a diffuser body. The diffuser body contains a first ceramic layer, a second ceramic layer, and a recessed area disposed between the first and second layers. Up to four (4) ceramic layers are stated to be preferred in alternative embodiments.

U.S. Pat. No. 5,863,031 to Veeder et al. describes a gas diffuser assembly which includes a housing formed of dense impermeable ceramic material and which defines an upwardly facing recess. A fitting formed of an inert material is located in the floor of the recess for connection to a gas supply tube. A diffuser element formed of porous ceramic material is secured to the housing over the recess to define an enclosed gas chamber. The diffuser disk and the housing are adhered together with a suitable cement.

It is, therefore, to the effective resolution of the aforementioned problems and shortcomings of the prior art that the present invention is directed. However, in view of the diffusers in existence at the time of the present invention, it was not obvious to those persons of ordinary skill in the pertinent art as to how the identified needs could be fulfilled in an advantageous manner.

SUMMARY OF THE INVENTION

Disclosed are several embodiments of a water aeration diffuser generally comprising a base having an internal cavity defining an air pocket, and a ceramic plate removably attached to the base. In some embodiments, the base is generally box-shaped and the ceramic plate matches the shape thereof. The base is configured to receive air from an air supply into the internal cavity whereby the air is diffused by the ceramic plate to create an aeration column in a body of water. To allow for repair and servicing, the ceramic plate is removably attached to the base by one or more fasteners, such as bolts, screws, rivets or the like. In some embodiments, the base includes a perimeter lip around its top portion that supports the ceramic plate and maximizes the exposed surface area of the plate. In some embodiments, a water and air-tight gasket is disposed between the lip and the ceramic plate. An eye-bolt may be provided through the ceramic plate and attached to the base to provide an attachment point for a ballast or other means used to position the diffuser.

The diffuser is designed for maximum aeration by way of the large percentage of exposed surface area of the ceramic plate with respect to the base. In some cases, as much as 90% of the ceramic plate is directly exposed to the internal cavity and thus the air supply. This generate efficient and highly effective aeration. To further enhance functionality and durability, an air supply fitting is attached to the base and the fitting may be in flow communication with a check valve and control valve for the air supply.

Accordingly, it is an object of the present invention to provide a water aeration diffuser that is serviceable and repairable through the use of a ceramic diffuser plate removably attached to a base.

It is yet another object of the present invention to provide a water aeration diffuser that has enhanced effectiveness and efficiency through the use of a ceramic plate that is maximally exposed to an air supply while the diffuser still retains its water and air-tight capabilities.

In accordance with these and other objects which will become apparent hereinafter, the instant invention will now be described with particular reference to the accompanying drawings.

DETAILED DESCRIPTION

Specific embodiments of the invention will now be further described by the following, non-limiting examples which will serve to illustrate various features. The examples are intended merely to facilitate an understanding of ways in which the invention may be practiced and to further enable those of skill in the art to practice the invention. Accordingly, the examples should not be construed as limiting the scope of the invention. In addition, reference throughout this specification to "some embodiments," "one embodiment," or "an embodiment" means that a particular feature, structure or characteristic described in connection with the embodiment is included in at least one embodiment of the present invention. Thus, appearances of the phrases "in some embodiments," "in one embodiment," or "in an embodiment" in various places throughout this specification are not necessarily all referring to the same embodiment. Furthermore, the particular features, structures or characteristics may be combined in any suitable manner in one or more embodiments.

Figure 1:
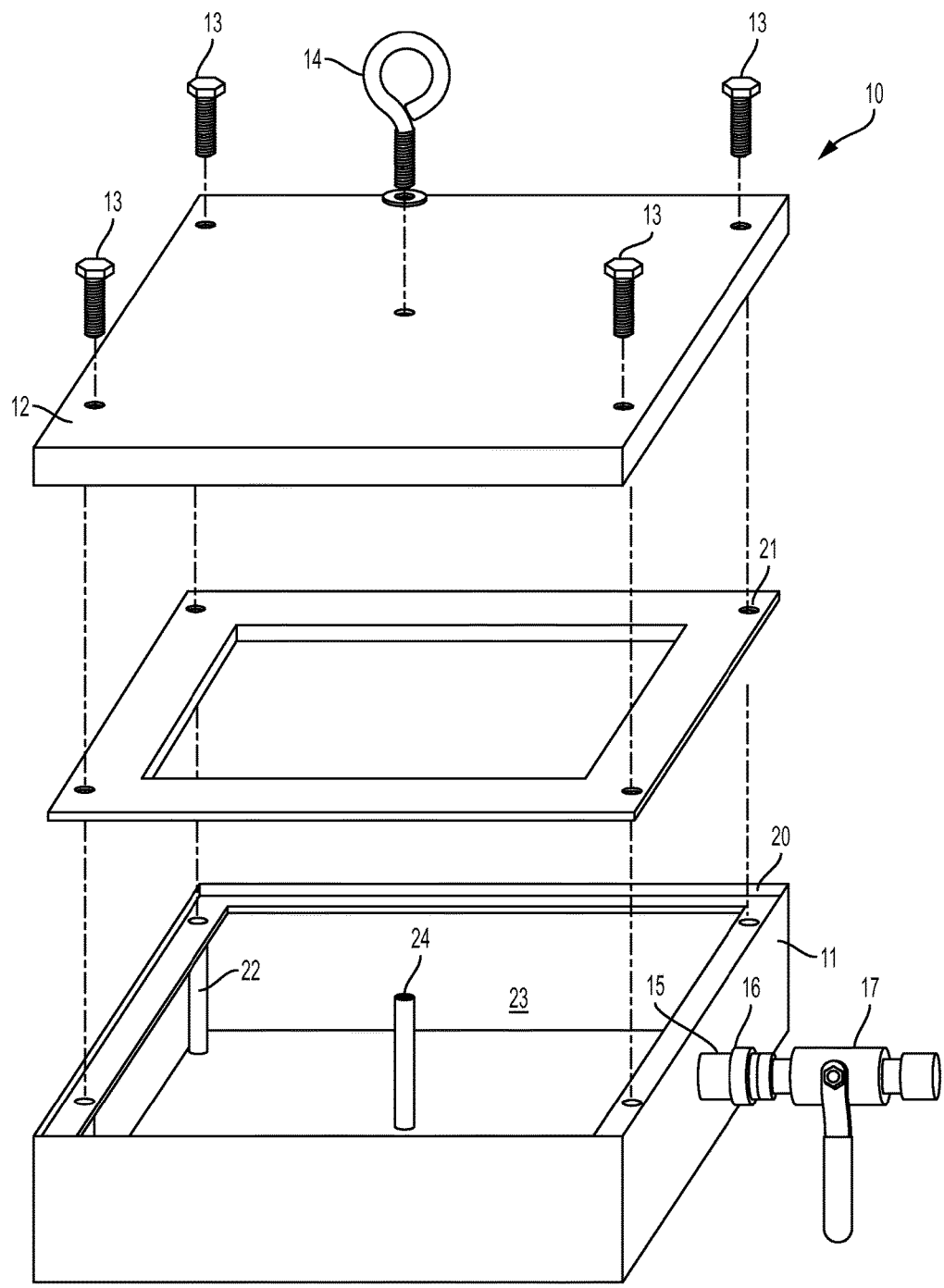
FIG. 1 is an exploded assembly view of one embodiment of the diffuser.

FIG. 1 is an exploded perspective view of one embodiment of the diffuser 10 comprising a base 11 and a ceramic plate 12. In some embodiments, base 11 is generally boxed-shaped and includes an internal air cavity 23. The base includes a perimeter lip 20 disposed around the top portion of the base. In some embodiments, the perimeter lip 20 is disposed slightly below the top edge of the main body so as to securely accommodate ceramic plate 12. Ceramic plate 12 comprises a micro-porous ceramic material and is disposed on the top of base 11 so as to form to the top of the box-like structure. In some embodiments, as noted, the ceramic plate 12 rests on top of perimeter lip 20. In some embodiments, a gasket 21 is disposed between the ceramic plate 12 and the perimeter lip 20 of the base 11. The gasket 21, which may comprise a rubber material such as EPDM (ethylene propylene diene monomer) rubber, assures a water and air tight seal between the ceramic plate 12 and the base 11, to prevent air from escaping from the diffuse 10 without passing through the ceramic plate 12.

In some embodiments, the ceramic plate 12 is removably attached to base 11 by one or more fasteners 13. Such fasteners may include bolts, screws, rivets, or other removable fastening means that permit the ceramic plate 12 to be readily attached and detached from the base 11. The fasteners 13 are, in some embodiments, provided through the ceramic plate 12 and into a corresponding bolt receiver 22 in the base 11. Preferably, these unions are water and air tight so as to prevent water leakage into the base 11 and to prevent loss of efficiency of the diffuser that would occur if air were to escape from the diffuser 10 without passing through the ceramic plate 12. Further still, in some embodiments, an eye-bolt 14 is attached to the outer surface of the ceramic plate 12. The eye-bolt 14 can be used to attach a ballast weight or a reaching device used to position the diffuser 10 within a body of water. In some embodiments, the eye-bolt 14 is received in a bolt receiver 24 disposed inside the cavity 23 of the base 11. The bolt receivers 22 and 24 may extend upward inside the cavity 23 to provide a secure attachment means to further secure the plate 12 to the base 11.

In some embodiments, an air supply fitting 15 is attached to one side of the base 11 and is in flow communication with the cavity 23 thereof. The fitting 15 is, in some embodiments, welded to the base 11 to assure reliability. A series of air supply plumbing may be provided as attached to fitting 15, including a check valve 16 and a control valve 17 each in successive flow communication one another. This plumbing allows the user to control the flow of air into the diffuser 10 either local to the diffuser 10 or from a remote location by way of a series of air supply lines. The check valve 16 also prevents back-flow of water up the airline from the diffuser, assuring the air supply remains operating safely. By providing air into the diffuser 10, an air pocket is created inside cavity 23 of the base which in turn cases air to diffuse through the microporous ceramic plate 12 to create a column of air bubbles to provide aeration for a body of water.

Figure 2:
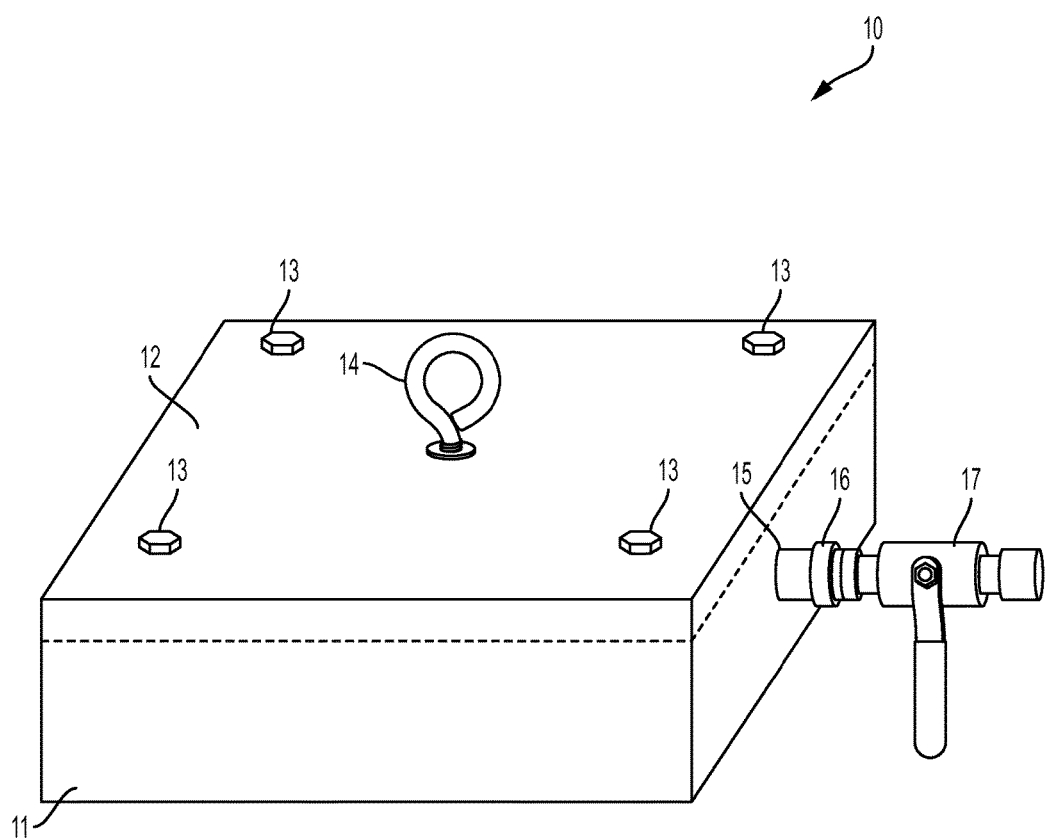
FIG. 2 is a perspective view of one embodiment of the diffuser in an assembled state.
Figure 3A:
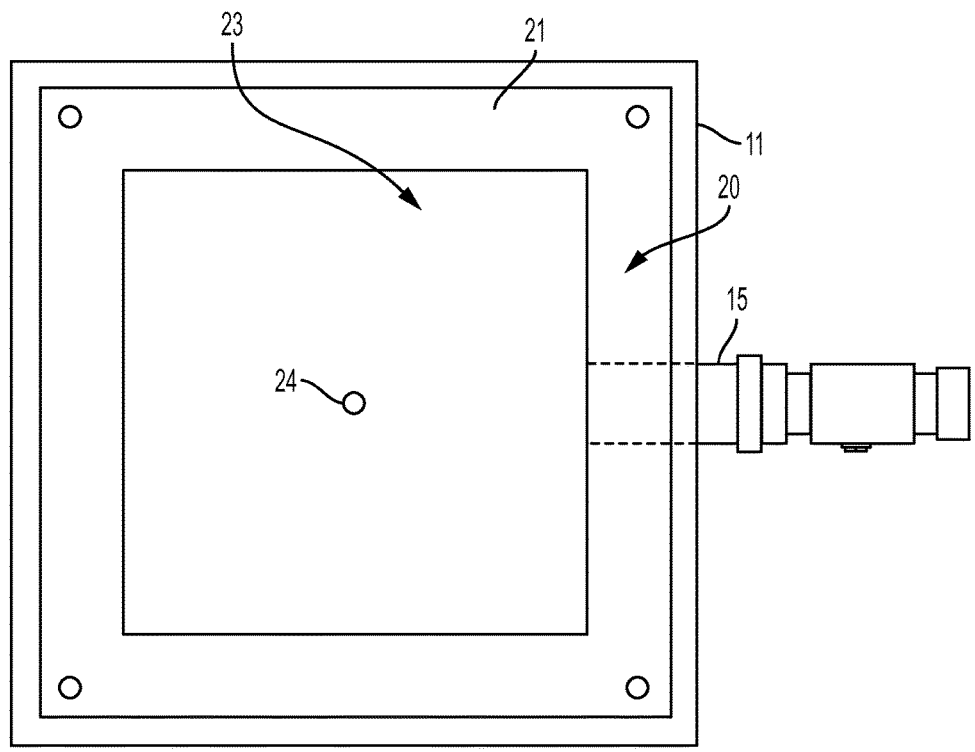
FIG. 3A is a top view of the main body of the diffuser.
Figure 3B:
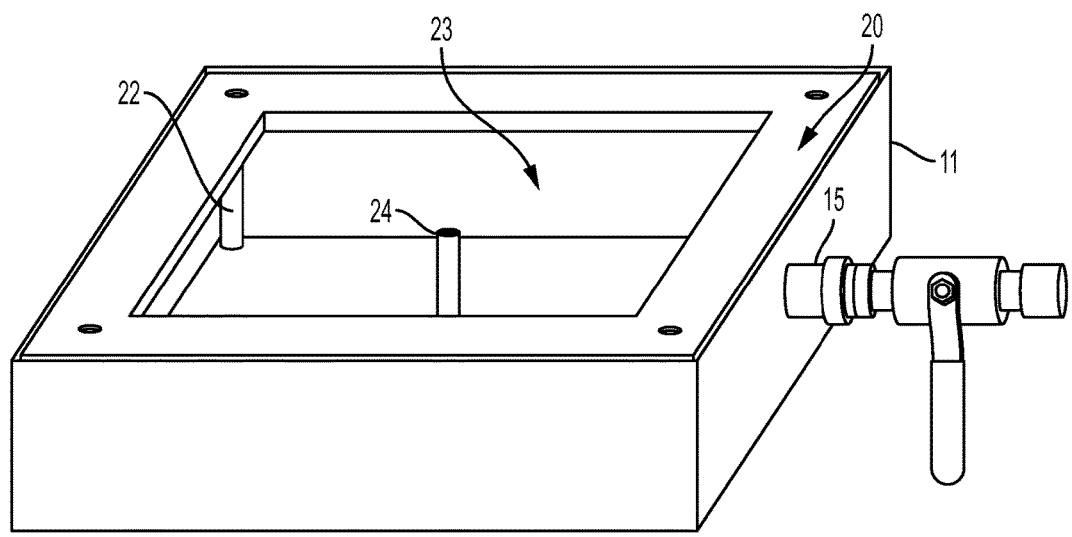
FIG. 3B is a perspective view of the main body of the diffuser.

FIG. 2 is a perspective view of the diffuser 10 in an assembled state. Ceramic plate 12 is securely attached to the base 11 such that diffuser 10 forms a complete unit that can be lowered into a body of water. FIG. 3A is a top view of the base 11 in isolation. Here it can be seen that the air supply fitting 15 is in flow communication with the cavity 23 of the base 11. The perimeter lip 20 is provided around the base 11 and the gasket 21 rests on the lip 20 as shown. FIG. 3B is a perspective view of the base 11 in isolation. Here it can be seen that, in some embodiments, the perimeter lip 20 is provided at an elevation slightly below the top edge of the base 11 so that the ceramic plate 12, when attached, will be accommodated in secure fashion. In other embodiments, the perimeter of the base 11 is slightly larger than the perimeter of the ceramic plate 12 such that the base 11 protrudes slightly out from the ceramic plate 12. Additionally, in some embodiments, bolt receivers 22 provide a receiving junction for fasteners 13, allowing the ceramic plate 12 to be removably attached to the base 11.

Figure 4:
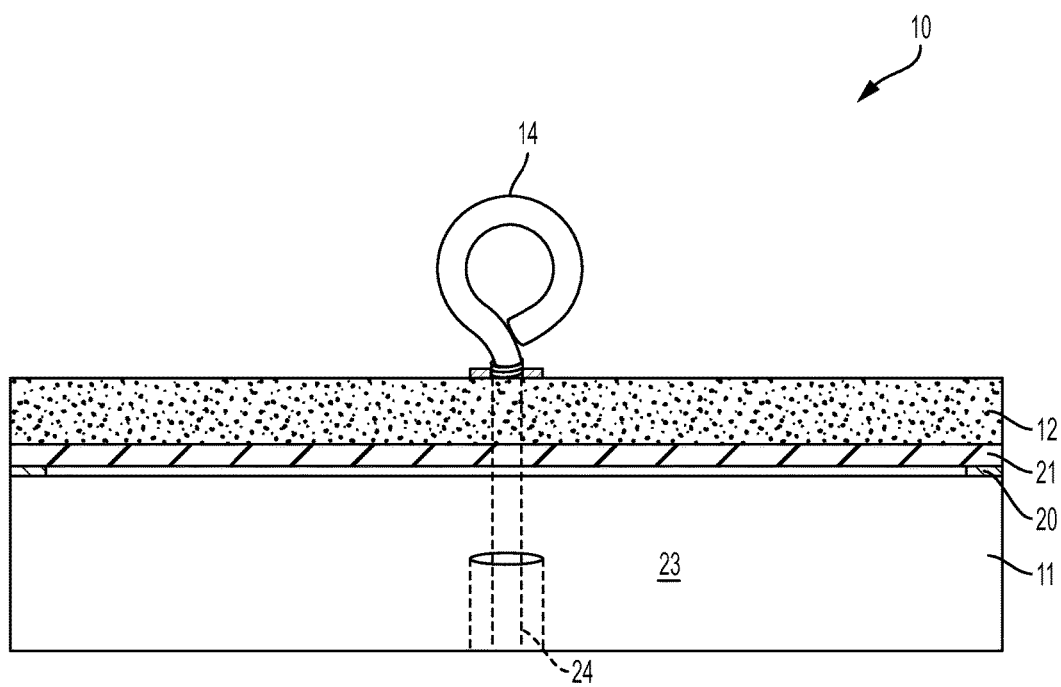
FIG. 4 is a cross-sectional end view of one embodiment of the diffuser.

FIG. 4 is a cross section end view of one embodiment of the diffuser 10. Here it can be seen how gasket 21 is disposed between the ceramic plate 12 and the perimeter lip 20 of the base 11 so as to form an air and water tight secure fitment between the plate 12 and the base 11. Additionally, the bolt receiver 24 and eye-bolt 14 arrangement is seen, with the eye-bolt 14 passing through the ceramic plate 12 and into the cavity 23 of the base 11 and then threaded into the bolt receiver 24. This adds additional rigidity and further reinforces the joining of ceramic plate 12 to the base 11.

The diffuser 10 of the present invention is designed to be disposed within a body of water, preferably resting on the bottom of the body of water. An air supply is attached to the fitting 15 and air is forced into the cavity 23 of the base 11, creating an air pocket within the diffuser 10. This air is diffused through the ceramic plate 12, creating a column of air bubbles within the body of water. The large amount of exposed surface area of the ceramic plate 12 within the base 11 provides efficient and effective air diffusion. The air bubbles cause to aeration and improved oxygenation of the body of water which helps sustain vegetation and wildlife in the body of water while avoiding the growth of harmful bacteria, algae, and pathogens.

The present invention has several advantages of the prior art. The diffuser 10 is designed to be completely serviceable and repairable in that the ceramic plate 12 is bolted onto the base 11 with one or more fasteners 13, as opposed to prior art systems that use glues and epoxies. The gasket 21 between the lip 20 and the plate 12 further assures an airtight and watertight fitment despite the fact that the plate 12 is not permanently affixed to the base 12. Because the plate 12 of the present invention is removable, it allows for cleaning of both sides of the ceramic plate 12, which extends the life of the diffuser 10. Further, should the plate 12 become damaged or no longer useful for aeration, it can be easily replaced without the need to replace the entire diffuser 10. In addition, the design of the base 11 and in particular the large exposed cavity 23 exposes in some cases 90% of the surface area of the ceramic plate 12 directly to the air pocket created inside cavity 23. This provides a substantial improvement over prior art diffusers that utilizes channels or routing in the ceramic plate that only provide approximately 10% exposed surface area directly to the air supply. The exposed surface area of the ceramic plate 12 can be varied by altering the width of the perimeter lip 20 of the base 11. In some embodiments, the lip is rather narrow, exposing maximum surface area of the plate 12 directly to the incoming air. The exposed surface area can be decreased, if so desired, by making the width of lip comparatively thicker.

The base 11, which may comprise stainless steel or other suitable material, and integrated steel air-supply fitting delivers much more durability and product longevity than a plastic base with a glued in fitting, as is known in the art Field failures of the existing technology is what prompted the development of an improved design. This combined with the more even distribution of the air supply results in significantly less clogging and will reduce the maintenance requirements for the diffuser. The more uniform distribution of air to the underside of the ceramic plate 12 also results in a more uniform column of air emerging from the top of the plate (determined through repeated observation). The more uniform air pattern coming from the top of the plate increases oxygen transfer and circulation efficiency within the body of water.

The ceramic plate 12 can be selected to vary in porosity and in some cases may be selected to have a porosity between 35-90 microns. The porosity can be altered to optimize oxygenation and circulation for given conditions. For example, testing has shown that the 90 micron porosity ceramic performs better at depths greater than 6 feet deep. The 35 micron porosity performs better at depths of less than 6 feet. In any event, the "open airflow" design of the base 11 results in less back pressure on the air supply, i.e. an air compressor, resulting in energy savings over time.

While specific embodiments have been described in detail, those with ordinary skill in the art will appreciate that various modifications and alternatives to those details could be developed in light of the overall teachings of the disclosures. Accordingly, the particular arrangements disclosed are meant to be illustrative only and not limiting of the invention, which is to be given the full breadth of the appended claims, and any and all equivalents thereof.

What is claimed is:

1. A water aeration diffuser, comprising:
   a generally flat, discrete base having an internal cavity;
   said flat base allowing said diffuser to sit upon the bottom or bed of a body of water;
   a ceramic plate removably attached to said base;
   said ceramic plate covering the entire base, eliminating gaps or discontinuities;
   a plurality of fasteners placed about the periphery of said base;
   said ceramic plate removably attached to said base by said plurality of fasteners;
   an eye-bolt, said eye-bolt disposed through said ceramic plate and attached to said base, said eye-bolt centrally located upon said diffuser; said eye-bolt allowing for the selective placement and removal of said diffuser within said body of water;
   wherein said base is configured to receive air in said internal cavity; and
   wherein said ceramic plate is configured to diffuse said air.

2. The water aeration diffuser of claim 1, wherein said fasteners comprise bolts, screws, rivets, or combinations thereof.

3. The water aeration diffuser of claim 1, wherein said base includes a perimeter lip on which said ceramic plate is attached.

4. The water aeration diffuser of claim 3, wherein a gasket is disposed between said perimeter lip and said ceramic plate to form a water tight seal therebetween.

5. The water aeration diffuser of claim 1, wherein said base is generally box-shaped.

6. The water aeration diffuser of claim 1, wherein substantially 90% of surface area of said ceramic plate is exposed to said internal cavity of said base.

7. The water aeration diffuser of claim 1, including an air supply fitting attached to a vertical wall of said base and in flow communication with said internal cavity.

8. The water aeration diffuser of claim 7, wherein said air supply fitting is welded to said base.

9. The water aeration diffuser of claim 7, wherein a check valve is in flow communication with said air supply fitting.

10. The water aeration diffuser of claim 9, wherein a control valve is in flow communication with said check valve.

11. The water aeration diffuser of claim 1, wherein said ceramic plate has a porosity between 35 and 90 microns.

12. A water aeration diffuser, comprising:
   a generally flat, discrete base including an internal cavity and a perimeter lip, said perimeter lip disposed around a top portion of said base;
   said flat base allowing said diffuser to sit upon the bottom or bed of a body of water;
   a microporous ceramic plate removably attached to said base;
   said ceramic plate covering the entire base, eliminating gaps or discontinuities;
   a plurality of fasteners placed about the periphery of said base;
   said ceramic plate removably attached to said base by said plurality of fasteners;
   an eye-bolt, said eye-bolt disposed through said ceramic plate and attached to said base, said eye-bolt centrally located upon said diffuser; said eye-bolt allowing for the selective placement and removal of said diffuser within said body of water;
   a gasket disposed between said ceramic plate and said perimeter lip; and
   wherein said base is configured to receive air into said internal cavity and diffuse said air through said microporous ceramic plate to create a bubble column.

* * * * *